(12) United States Patent
Mirsky (10) Patent No.: US 11,303,551 B2
(45) Date of Patent: Apr. 12, 2022

(54) NETWORK ERROR PERFORMANCE MEASUREMENT

(71) Applicant: ZTE Corporation, Guangdong (CN)

(72) Inventor: Gregory Mirsky, Pleasanton, CA (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/926,540

(22) Filed: Jul. 10, 2020

(65) Prior Publication Data

US 2022/0014453 A1 Jan. 13, 2022

(51) Int. Cl.
*H04L 43/0829* (2022.01)
*H04L 41/0631* (2022.01)
*H04L 43/50* (2022.01)

(52) U.S. Cl.
CPC ...... *H04L 43/0829* (2013.01); *H04L 41/0631* (2013.01); *H04L 43/50* (2013.01)

(58) Field of Classification Search
CPC .. H04L 43/0829; H04L 41/0631; H04L 43/50
See application file for complete search history.

(56) References Cited

U.S. PATENT DOCUMENTS

| | | | |
|---|---|---|---|
| 2005/0163053 A1 | 7/2005 | Paton et al. | |
| 2008/0133180 A1 | 6/2008 | Floyd et al. | |
| 2014/0269347 A1* | 9/2014 | Gintis | H04L 43/50 370/244 |
| 2015/0163152 A1* | 6/2015 | Li | H04L 41/5019 370/409 |
| 2019/0280914 A1* | 9/2019 | Menon | H04L 43/50 |
| 2019/0296997 A1* | 9/2019 | Menon | H04L 43/0829 |
| 2020/0014619 A1* | 1/2020 | Shelar | H04L 45/125 |

FOREIGN PATENT DOCUMENTS

| | | |
|---|---|---|
| CN | 1645823 A | 7/2005 |
| CN | 108353001 A | 7/2018 |

OTHER PUBLICATIONS

ITU-T, "End-to-end error performance parameters and objectives for international, constant bit-rate digital paths and connections," ITU-T Recommendation G.826, 32 pages, Dec. 2002.
Katz, D., et al., "Bidirectional Forwarding Detection (BFD)," Internet Engineering Task Force (IETF), RFC 5880, ISSN 2070-1721, 49 pages, Jun. 2010.
International Search Report and Written Opinion for International Patent Application No. PCT/CN2021/105696, dated Sep. 28, 2021 (8 pages).

* cited by examiner

*Primary Examiner* — Umar Cheema
*Assistant Examiner* — James Ross Hollister
(74) *Attorney, Agent, or Firm* — Perkins Coie LLP (57) ABSTRACT

Techniques are described for performing error performance measurement in a packet data communication network such as a packet switching network (PSN). An example method of error performance measurement includes determining, upon expiration of a time period, that a number of one or more test packets received by the first device during the time period is less than an expected number of test packets, where the one or more test packets are received by the first device from the second device in a packet data communication network, and triggering, based on the determining, an error performance measurement that includes evaluating a type of failure for the time period and evaluating one or more types of failures for one or more consecutive time periods that immediately precede the time period.

18 Claims, 9 Drawing Sheets

| Vers | Diag | Sta | Length |
|------|------|-----|--------|
| My Discriminator ||||
| Your Discriminator ||||
| ... ||||

NETWORK ERROR PERFORMANCE MEASUREMENT

TECHNICAL FIELD

This disclosure is directed generally to error performance measurement in packet data communications networks.

BACKGROUND

A communication network may include one or more paths that can be traversed by a packet, such as an Internet Protocol (IP) packet. A communication network performs measurements to characterize the network conditions. Based on the measured performance, a computing device may determine whether to change the flow of the packet or whether to allocate computational resources so that the packet can efficiently traverse the communication network.

SUMMARY

Techniques are disclosed for performing error performance measurement (EPM) for a packet data communication network such as a packet switching network (PSN).

An example method of packet communication comprises determining, upon expiration of a time period, that a number of one or more test packets received by the first device during the time period is less than an expected number of test packets, wherein the one or more test packets are received by the first device from the second device in a packet data communication network; and triggering, based on the determining, an error performance measurement that includes evaluating a type of failure for the time period and evaluating one or more types of failures for one or more consecutive time periods that immediately precede the time period.

In some embodiments, each of the one or more test packets includes a field that indicates whether a defect condition exists, and the evaluating the type of failure for the time period includes: determining that the type of failure for the time period is an errored second (ES) either (1) upon determining that a difference between the number of the one or more test packets and the expected number of test packets is greater than or equal to one, or (2) upon determining that the one or more test packets indicate that the defect condition exists, or (3) upon determining that no test packets were received within a second time period. In some embodiments, the evaluating the type of failure for the time period and the evaluating the one or more types of failures for one or more consecutive time periods that immediately precede the time period includes: determining that a state of connection between the first device and the second device is available upon determining that the type of failure for the time period is ES and upon determining that the one or more types of failures for the one or more consecutive time periods are one or more ES, or one or more error-free second condition, or any combination thereof, wherein the one or more error-free second condition includes one or more time periods in which the type of failure is not the ES or a severely errored second (SES); and transmitting, to the second device or another device, a message that indicates that the state of connection is available.

In some embodiments, each of the one or more test packets includes: a field that indicates whether a defect condition exists, and the evaluating the type of failure for the time period includes: determining that the type of failure for the time period is a severely errored second (SES) either (1) upon determining that a difference between the expected number of test packets and the number of the one or more test packets received is more than a configurable percentage of the expected number of test packets, or (2) upon determining that the one or more test packets indicate that the defect condition exists, or (3) upon determining that no test packets were received within a second time period. In some embodiments, the evaluating the type of failure for the time period and the evaluating the one or more types of failures for one or more consecutive time periods that immediately precede the time period includes: determining that a state of connection between the first device and the second device is unavailable upon determining that the type of failure for the time period and the one or more types of failures for the one or more consecutive time periods are the SES; and transmitting, to the second device or another device, a message that indicates that the state of connection is unavailable. In some embodiments, the packet data communication network is a packet switching network (PSN).

In yet another exemplary aspect, the above-described methods and/or the methods described in this patent document are embodied in the form of processor-executable code and stored in a computer-readable program medium. The computer readable program is stored on a non-transitory computer readable media, the computer readable program including code that when executed by a processor, causes the processor to implement the methods described in this patent document.

In yet another exemplary embodiment, a device is disclosed that is configured or operable to perform the above-described methods and/or the methods described in this patent document.

The above and other aspects and their implementations are described in greater detail in the drawings, the descriptions, and the claims.

DETAILED DESCRIPTION

Error performance measurement (EPM) is a component of an Operations, Administration, and Maintenance (OAM) toolset that provides an operator with information related to network measurements for a uni-directional or a bi-directional connection between two systems. EPM may be locally associated with a set of client applications or services to send information about their state and/or performance to a remote system. In current technology, EPM has been defined only for data communication methods that have a constant bit-rate transmission and not for packet switching networks (PSN), which may be statistically random. PSN can be a statistically multiplexed network so that a receiver node (e.g., a first server) may not have an expectation when a packet will arrive from a sender node (e.g., a second server). This patent document introduces techniques to extend EPM for the PSN environment, which can complement the existing fault management (FM) and performance monitoring (PM) OAM mechanisms for PSN environment.

The example headings for the various sections below are used to facilitate the understanding of the disclosed subject matter and do not limit the scope of the claimed subject matter in any way. Accordingly, one or more features of one example section can be combined with one or more features of another example section. Section I first provides a general description of the current EPM OAM technology. Section II describes exemplary techniques for implementing EPM technology for a packet data communication network such as PSN. The EPM related techniques are described in Section II for PSN for ease of explanation. However, the exemplary EPM related techniques in Section II can be implemented in other types of packet data communication networks.

I. Current EPM Technology

EPM OAM technology is described for constant bit-rate connections for which state of availability or a state of unavailability between two systems (or two devices) are described. However, in current EPM technology, the method of measuring error performance parameters, such as state of unavailability and state of availability, is suitable only for communication methods in which a signal is transmitted in assigned periods regardless of whether the signal carries user data or serves only to fill in the interval. Thus, the current techniques to measure error performance parameters cannot be adequately applied to PSNs that may have data planes such as internet protocol (IP) or multi-protocol label switching (MPLS) at least because each connection may be packetized and may occupy statistically random time intervals.

II. EPM Technology for Packet Data Communication Networks

The proposed EPM method uses a constructed flow of packets injected in a packet data communication network such as PSN. The constructed flow of packets may include bi-directional forwarding detection (BFD) control packets.

Figure 1:
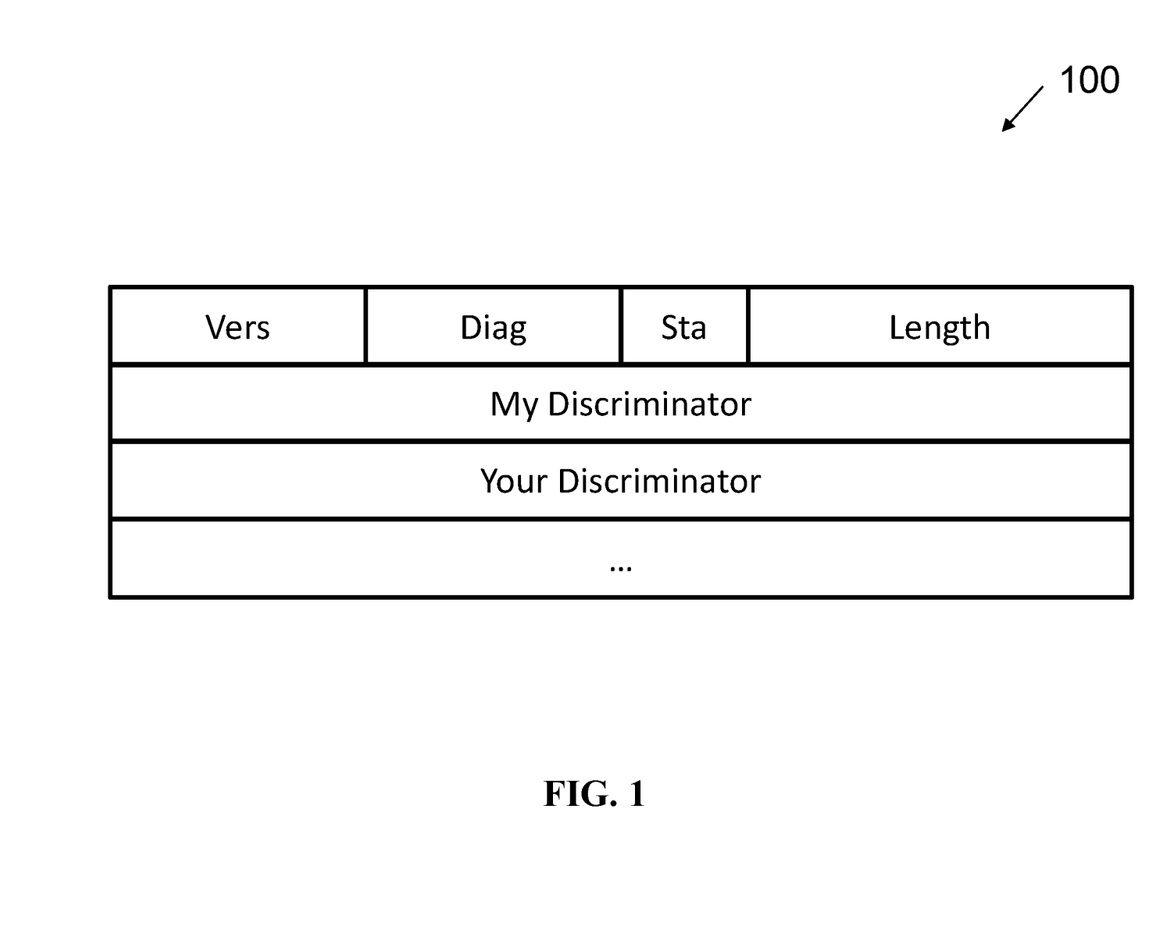
FIG. 1 shows an example format for some fields of a bi-directional forwarding detection (BFD) control packet.

FIG. 1 shows an example format for some fields of a BFD control packet 100. The BFD control packet 100 can include information for establishing a BFD session between two devices. The Vers field indicates the version number of the protocol. The Diag field refers to a diagnostic code specifying the local system's or device's reason for the last change in session state. The Diag field can indicate a whether an error or a defect exists, and if it exists, the type of error or defect condition. A defect indicated by the Diag field can characterize a path between two devices (e.g., between a sender device 202 and a receiver device 206 in FIG. 2). An error indicated by the Diag field can characterize a quality of the communication between two devices (e.g., between a sender device 202 and a receiver device 206 in FIG. 2).

In some embodiments, the Diag field can include any one value from the following pre-determined list where each value is associated with a corresponding reason: 0—No Diagnostic; 1—Control Detection Time Expired; 2—Echo Function Failed; 3—Neighbor Signaled Session Down; 4—Forwarding Plane Reset; 5—Path Down; 6—Concatenated Path Down; 7—Administratively Down; and 8—Reverse Concatenated Path Down. In an implementation example, the value of 1, 3, 4, 6, and 8 in the Diag field can indicate that a defect exists between two devices, and the value of 4 and 7 in the Diag field can indicate that an error exist between two devices. In some embodiments, the Diag field can include other pre-determined value from a range of unassigned values (e.g., a value of 10 can be used to indicate another type of error and values of 51 and 62 can be used to indicate other types of defects). In some embodiments, the Diag field that includes a value of 0 to indicate an absence of a diagnostic information.

In FIG. 1, the State field (Sta) indicates a condition of a current BFD session state between the sender device and a receiver device as determined by the sender device. For example, a value of 1 in the Sta field corresponds to a Down state and a value of 3 corresponds to an Up state. An "up state" can mean that the BFD session has successfully been established between the sender device and the receiver device and can imply that the connectivity between the sender device and the receiver device is working. A "down state" can mean that the session is down (or has just been created). The Length field indicates the length of the BFD control packet 100, in bytes. The My Discriminator field includes a unique, nonzero discriminator value generated by a sender device that can be used to demultiplex multiple BFD sessions between the same pair of systems. The Your Discriminator field includes a discriminator value unique for the corresponding remote BFD system or receiver device. Additional fields can be added to the example BFD control packet 100.

The BFD control packets (also known as test packet) used for the example EPM method can have the example format shown in FIG. 1. A technical benefit of using the BFD control packets is that they can be constructed to enable the BFD packets to share fate with the data flow in which error performance is measured. For instance, the BFD control packets can be constructed to follow the same physical path and may experience the same treatment as data that flows between two nodes (e.g., a first server and a second server through the cloud or Internet). In one example implementation, the BFD control packets can be encapsulated in a MPLS label stack to use the MPLS data plane. The BFD control packet encapsulated in MPLS header includes entropy label so that the BFD control packets used to measure error performance of a path in a network, as explained in the error performance measurement techniques patent document, can have the same entropy label as the entropy label used for a data packet. Thus, BFD control packets can traverse the same path in the network as the data packet. In another example implementation, the BFD control packets can be encapsulated in an IPv6 header or IPv6 data plane. The BFD control packet encapsulated to be transmitted over IPv6 data plane includes a flow label in the IPv6 header that is the same as the flow label used for the data packet. A technical advantage of using the BFD control packets is that they may not significantly affect the packet data communication network and/or the BFD control packets may not cause errors on the flow being monitored.

OAM technology in PSN includes tools for fault management (FM) and performance monitoring (PM). The FM OAM is usually light-weight and can support detection of failures within, e.g., a 10 msec time window (also known as detection interval or detection timer) using 3.3 msec interval between two consecutive test packets. Thus, the FM OAM process can transmit around 300 test packets per second, and the fate of the test packets can be used as a statistical representation of the fate experienced by the monitored data flow. The time window for the detection interval (e.g., a 10 msec) can be calculated using the time interval (e.g., 3.3 msec) between two consecutive test packets and a detect multiplier value advertised in a BFD control packet. A detect multiplier value may be 3, as an example. The time interval between two consecutive test packets can be negotiated between two devices (e.g., between a sender device 202 and a receiver device 206 in FIG. 2). Thus, for example, if a defect detection module (shown as 725 in FIG. 7) in the receiver device determines that less than a total number of test packets are received within a time window, the defect detection module can determine a presence of a defect and increment a defect counter as further described in FIGS. 3A, 3B, and 4. BFD control packets having an example format as shown in FIG. 1 can be used as a defect detection FM protocol in PSN.

Figure 2:
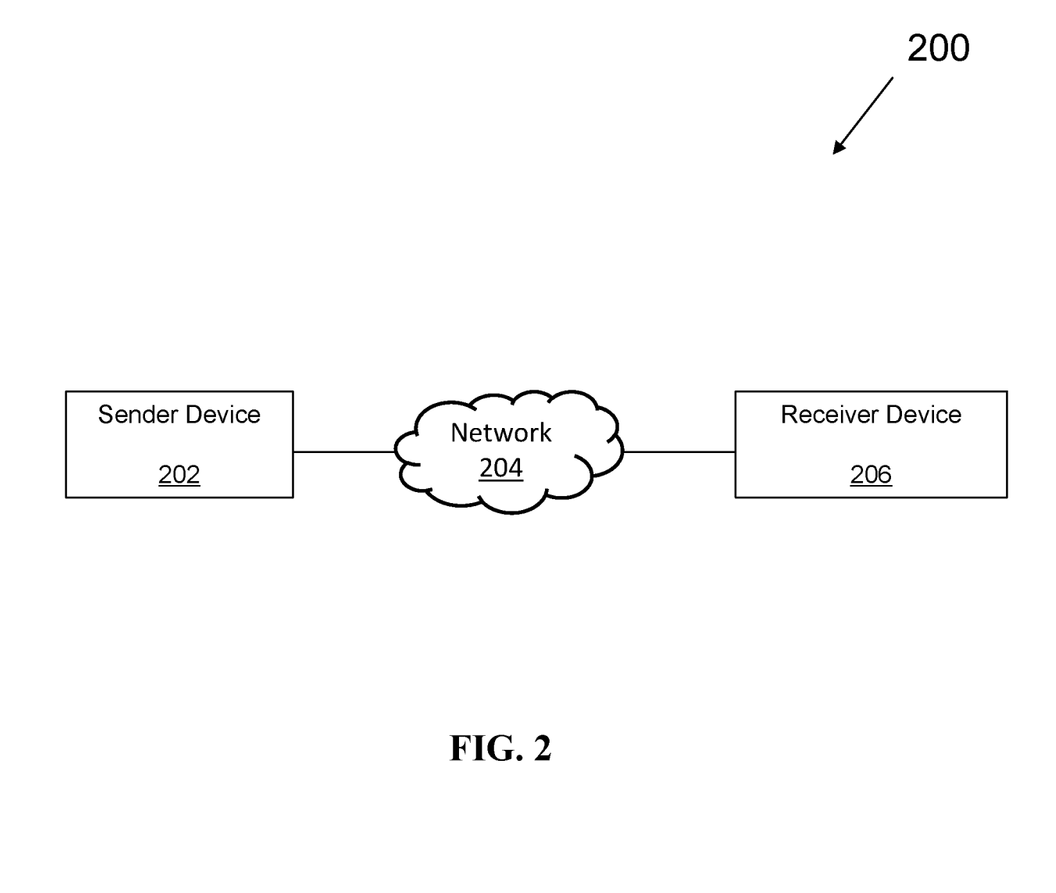
FIG. 2 shows an example packet switching network (PSN) system in which an error is detected using BFD control packets.

FIG. 2 shows an example PSN system 200 in which an error is detected using BFD control packets. The example PSN system 200 includes a sender device 202 and a receiver device 206 that can communicate with each other via a PSN 204. In the PSN system 200, the sender device 202 (e.g., a first server) can periodically send a plurality of BFD control packets to the receiver device 206 (e.g., a second server). The receiver device 206 includes a defect detection module that can use the received periodic BFD control packets to detect a failure in a path over the PSN system 200 by identifying a number of consecutively missed test packets. When the defect detection module of the receiver device 206 determines that the number of consecutively missed test packets reaches a pre-determined threshold, the defect detection module determines and/or declares that a failure has been detected. In some embodiments, the defect detection module can send a BFD control packet to the sender device 202 (or to other devices) indicating that a failure has been detected by the receiver device 206. The BFD control message can also communicate the state of the receiver device 206 associated with the BFD session, e.g., upstream concatenated path or local application.

EPM technology for a packet data communication network, such as a PSN, may describe error performance by characterizing the error experience within one second as either an error-free second, an errored second (ES) or a severely errored second (SES). An error-free second can include a time period (e.g., one second) for which a type of failure is not described by an ES or SES. For PSN, an ES and a SES can be described by considering the statistical character of PSN communication. For example, an ES can be described as a one-second time period in which one or more expected periodic test packet was not received or in which one or more defects where detected. In another example, an SES can be described as a one-second time period in which either no less than a configurable percentage (e.g., 20% or 40%) of expected periodic test packets were not received or in which one or more defects were detected. A BFD control packet can indicate a defect by indicating that the BFD session is down with the state field in the BFD control packet or by indicating a presence and type of defect in the diagnostic field in the BFD control packet, as explained in FIG. 2. As further explained in FIGS. 3A and 3B, for both ES and SES, a defect may be signaled to the remote BFD system (e.g., receiver device 206 in FIG. 2) in the BFD control packet or detected locally by the remote BFD system upon determining, by the defect detection module, that a detection interval has expired with no BFD control packets received by the remote BFD system. In some embodiments, the detection interval can be less than and within the one-second time period. For example, the detection interval can be multiple 10 msec time windows (or another time window) within the one-second time period. The configurable percentage for the SES can have a default value (e.g., 30%).

Figure 3A:
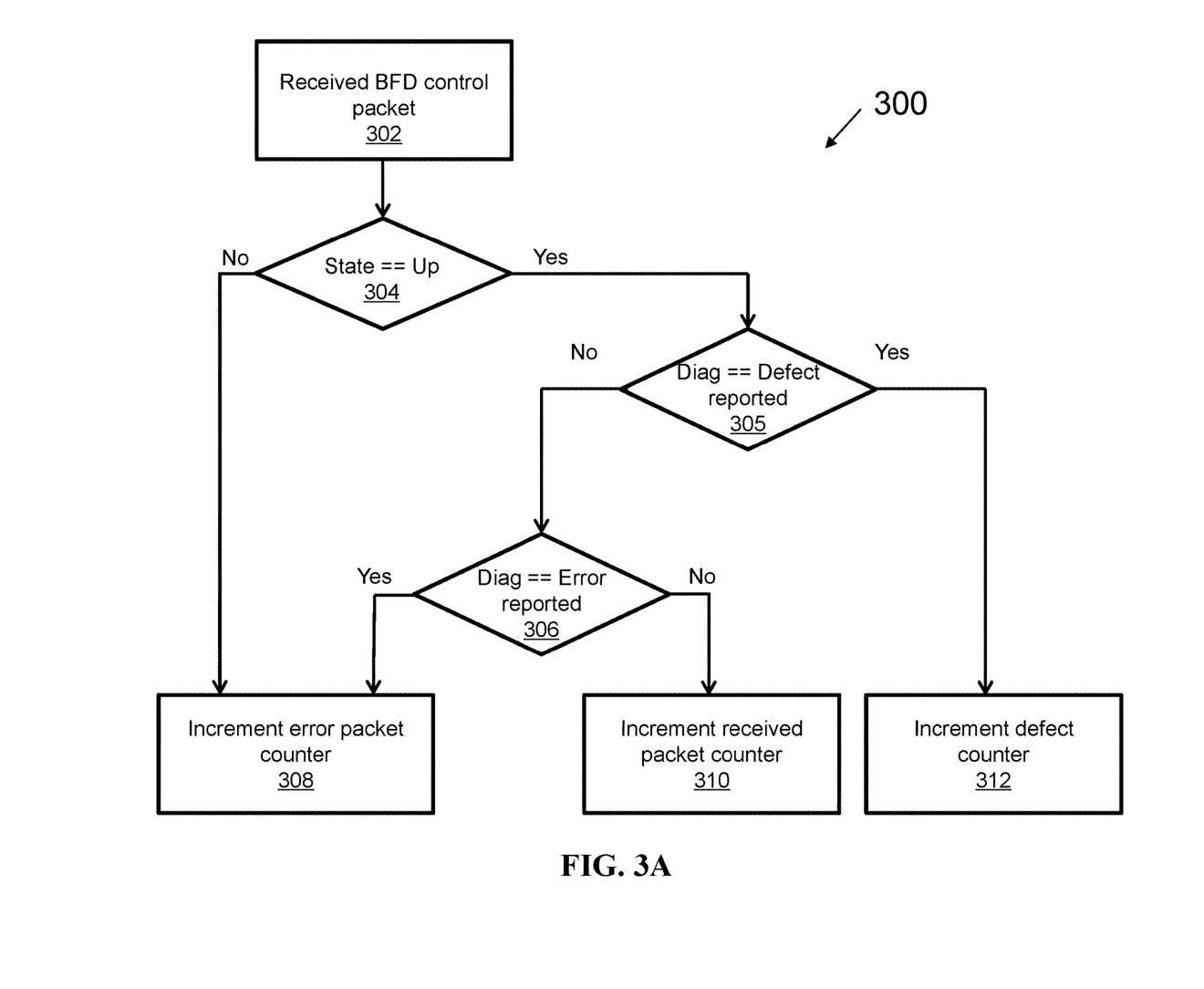
FIG. 3A shows an example flowchart of operations performed by a receiver device in a PSN for error performance measurement.

FIG. 3A shows an example flowchart 300 of operations performed by a receiver device in a PSN for error performance measurement. At operation 302, the defect detection module of the receiver device receives a BFD control packet having an example format shown in FIG. 1. At operation 304, the defect detection module determines whether the State field in the BFD control packet indicates that the State is in an Up condition. At operation 304, if the defect detection module determines that the State field indicates that the BFD state is up, then the defect detection module proceeds to operation 305.

At operation 305, the defect detection module determines whether the Diag field in the BFD control packet whether a defect is reported. At operation 305, if the defect detection module determines that the Diag field reports a defect condition, then the defect detection module can increment a defect packet counter (e.g., increment the defect packet counter by one) at operation 312. At operation 305, if the defect detection module determines that the Diag field does not indicate a defect condition, then the defect detection module proceeds to operation 306.

At operation 306, the defect detection module determines whether the Diag field in the BFD control packet indicates whether an error is reported. At operation 306, if the defect detection module determines that the Diag field reports an error condition, then the defect detection module can increment an error packet counter (e.g., increment the error packet counter by one) at operation 308. In some embodiments, operations 305 and 306 can be performed in one step.

At operation 304, if the defect detection module determines that the State field indicates that the BFD state is down, then the defect detection module proceeds to operation 308 and increments the error packet counter. Thus, if either an error condition is indicated by the Diag field or if the State field indicates that the BFD state is down, the defect detection module can determine that an error condition is present and perform operation 308. At operation 306, if the defect detection module determines that the Diag field does not report an error condition, then the defect detection module can increment a received packet counter (e.g., increment the received packet counter by one) at operation 310. Thus, if the Diag field does not indicate either an error condition or a defect condition, the defect detection module can increment a received packet counter. Thus, the received packet counter can exclude one or more BFD control packets without a defect condition or error condition indicated. The operations shown in FIG. 3A can be performed every time a BFD control packet is received by the defect detection module of the receiver device.

Figure 3B:
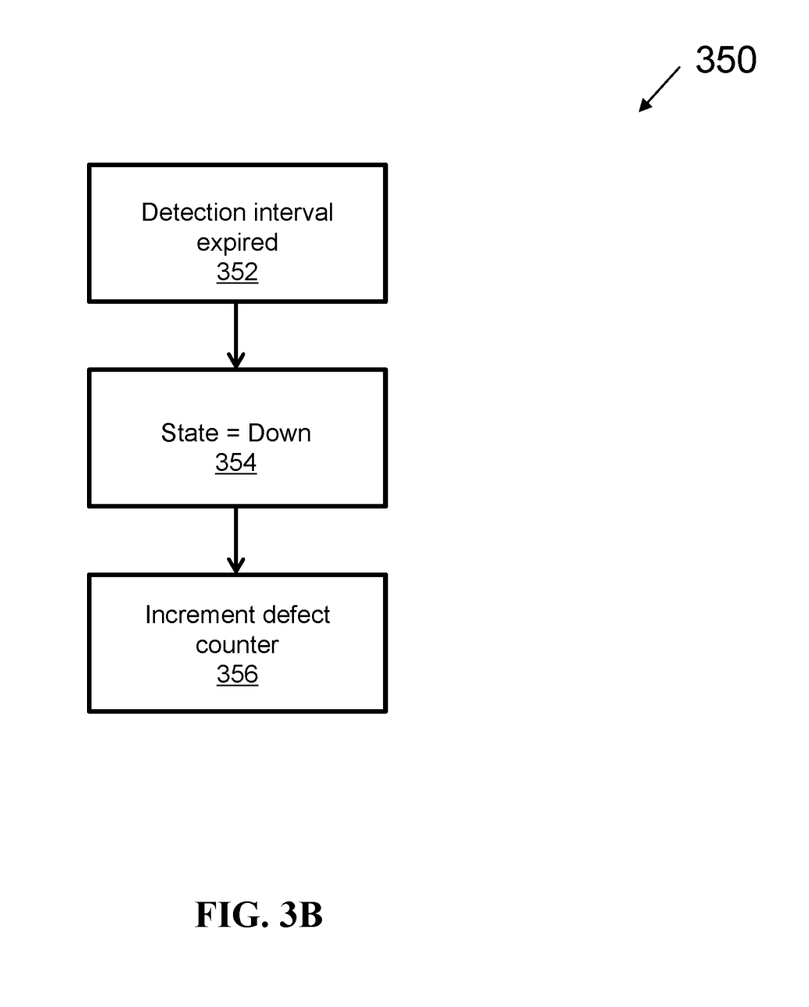
FIG. 3B shows an example flowchart to determine a presence of a defect condition by a receiver device without analyzing the BFD control packets.

FIG. 3B shows an example flowchart 350 to determine a presence of a defect condition by a receiver device without analyzing the BFD control packets. As mentioned in this patent document, a receiver device and a sender device can calculate a time window for the detection interval based on a negotiated time interval between two consecutive test packets sent by the sender device and based on a detect multiplier value advertised in a BFD control packet. The detection interval can continuously operate to enable the defect detection module to determine a presence of a defect when no BFD control packets are received by the receiver device within a time window indicated by the detection interval. For example, the detection interval can be calculated to be 10 msec if the time interval between two consecutive test packets is negotiated to be 3.3 msec and if the example detect multiplier value is 3. In the above example, if the defect detection module determines that any one of the three test packets are received before the 10 msec timer expires, then the defect detection module can reset the detection interval.

At operation 352, if the defect detection module determines that a detection interval has expired without having received the any BFD control packets (so that no BFD control packets are received within the detection interval), then the defect detection module proceeds to operation 354. At operation 354, the defect detection module determines that the state is down and proceeds to operation 356 where the defect detection module increments the defect counter. Thus, using the example flowchart of FIG. 3B, the receiver device can determine a presence of a defect independent of receiving BFD control packets that can also indicate a defect.

Figure 4:
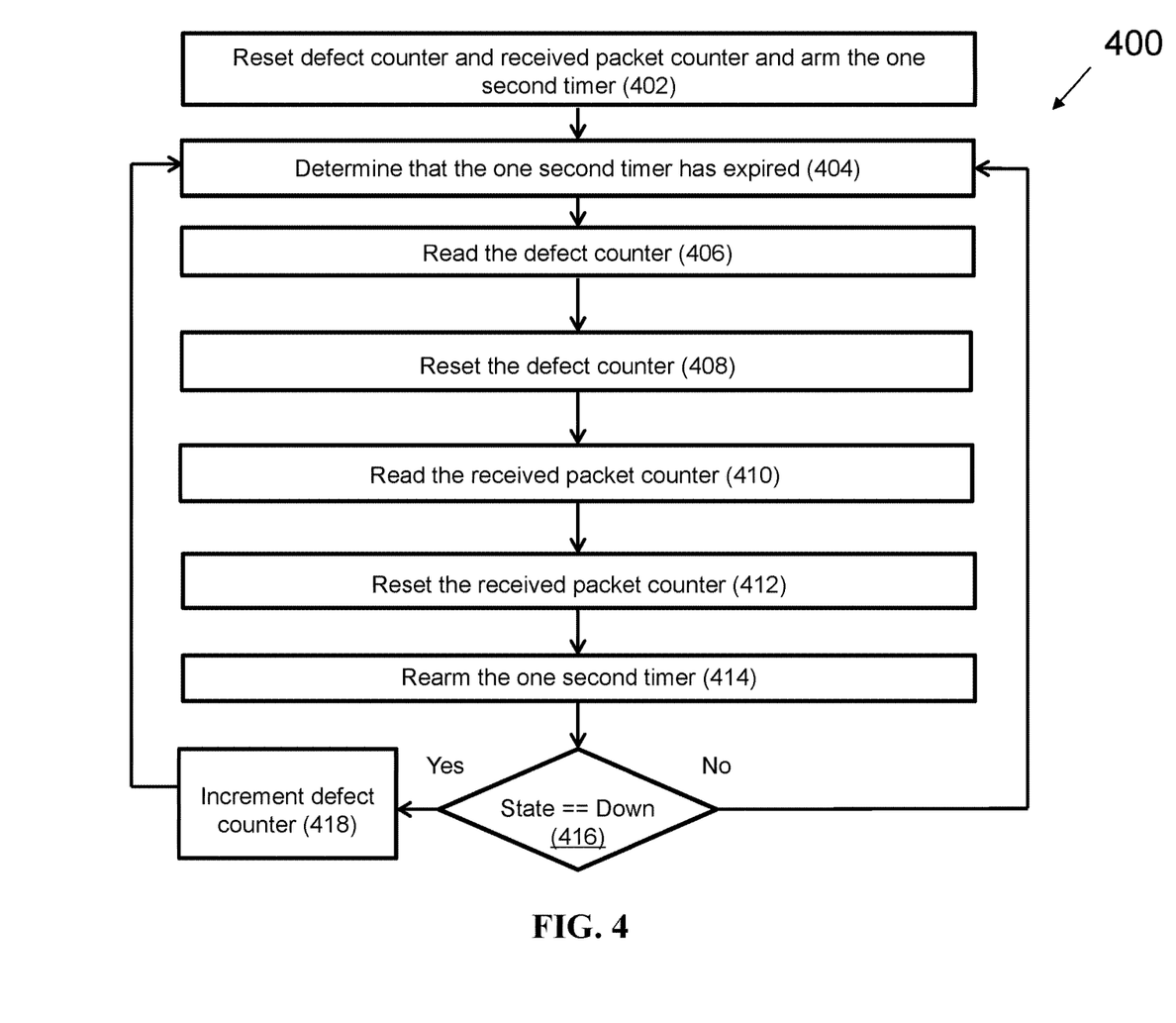
FIG. 4 shows an example flowchart 400 used to manage the counters of the received device.

FIG. 4 shows an example flowchart 400 used to manage the counters of the received device. The receiver device uses a one-second-long EPM timer to evaluate the result of the received packet counter. The "one-second-long" time value is an example time value. In some embodiments, other time values can be used. At operation 402, the defect detection module resets a defect counter and a received packet counter and can arm (or initiate) the one second timer to start counting down to zero or up to one second. At operation 404, the defect detection module determines that the one second timer has expired, and then proceeds to operations 406 to 416.

At operations 406 and 410, the defect detection module respectively reads the defect counter and the received packet counter values. The defect counter and the received packet counter are the same as described in FIG. 3A. At operations 408 and 412, the defect detection module respectively resets the defect counter and the received packet counter values. At operation 414, the defect detection module rearms or resets the one second timer so that the one-second timer may start counting down to zero or up to one second.

At operation 416, the defect detection module determines whether the state is down. As explained in FIG. 3B, the defect detection module can determine whether a state is down if the receiver device does not receive N continuous test packets within a time window (e.g., detection interval). If the defect detection module determines a presence of a defect, using the techniques described in FIG. 3B, then the defect detection module can increment the defect counter at operation 418. After operation 418, the process can go back to operation 404. At operation 416, if the defect detection module does not determine a presence of a defect, the process can go back to operation 404. In some embodiments, operations 416 and 418 can be performed in between operations 412 and 414. For example, after operation 412, operation 416 can be performed. In such embodiments, if a defect is determined to exist, then operation 418 is performed followed by operation 414. In such embodiments, if a defect is not determined to exists at operation 416, then operation 414 is performed.

Figure 5:
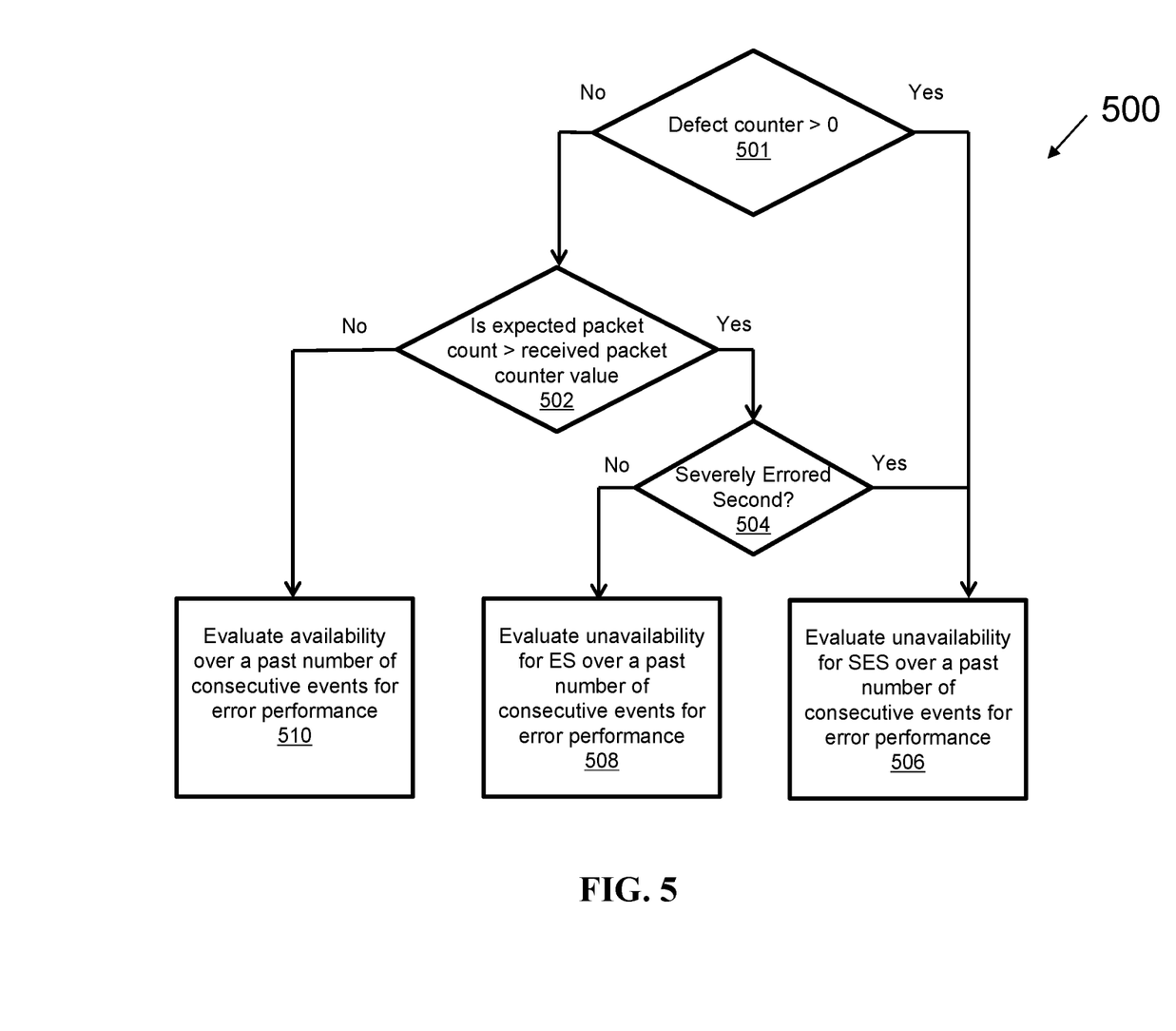
FIG. 5 shows an example flowchart of an error performance measurement (EPM) evaluation of the quality of the past one-second interval.

FIG. 5 shows an example flowchart 500 of an EPM evaluation of the quality of the past one-second interval. The defect detection module evaluates the number of defects (as indicated by the defect counter read at operation 406) and the number of proper BFD control packets (as indicated by the received packet counter read at operation 410 in FIG. 4) received over a previous one second period. The defect detection module determines a presence of a defect by determining whether a defect counter is more than zero at operation 501. At operation 501, if the defect detection module determines that a defect counter is more than zero, then the detect detection module proceeds to operation 506 as further described below.

At operation 502, the defect detection module compares the received packet counter value to a number of the expected BFD control packets (shown as "expected packet count" in operation 502 in FIG. 5) that are expected to be received in a second. The number of expected packets may be determined based on a negotiated time interval between two consecutive BFD control packets between the sender device and the receiver device. For example, if the negotiated interval between two consecutive BFD control packets is 3.3 msec, then the number of expected packets is 303 in a one-second time period. At operation 502, if the defect detection module determines that the expected packet count is greater than the received packet counter value, then the defect detection module proceeds to operation 504 where the defect detection module determines whether the previous one-second time period was a severely errored second.

As explained in this patent document, a SES can be described as a one-second period in which no less than a configurable percentage (e.g., 20% or 40%) of expected periodic test packets were not received or in which one or more defects were detected. A difference between the expected packet count and the received packet counter value are the number of packets that were not received. And, the value of the defect packet counter over the previous one-second time period can be the number of packets received with an active defect and/or a number of defects detected by the receiver device as explained in FIG. 3B.

In some embodiments, at operation 504, if the defect detection module determines that more than a configurable percentage of expected periodic BFD control packets were not received (e.g., if ((expected packet count−received packet counter value)/expected packet count*100)>configurable percentage)), then the defect detection module performs operation 506 by evaluating an unavailability condition for SES as further described below.

At operation 506, the defect detection module can evaluate whether an unavailability period exists for the PSN by evaluating a past number of consecutive events for error performance. For example, a number of past consecutive events can include the past ten seconds that includes the immediately past one-second time period and the previous nine seconds immediately preceding the immediately past one-second time period. The previous nine seconds are previously evaluated by the defect detection module to determine whether they can be characterized as ES or SES or neither using the operations described in FIGS. 3A to 5.

Figure 6:
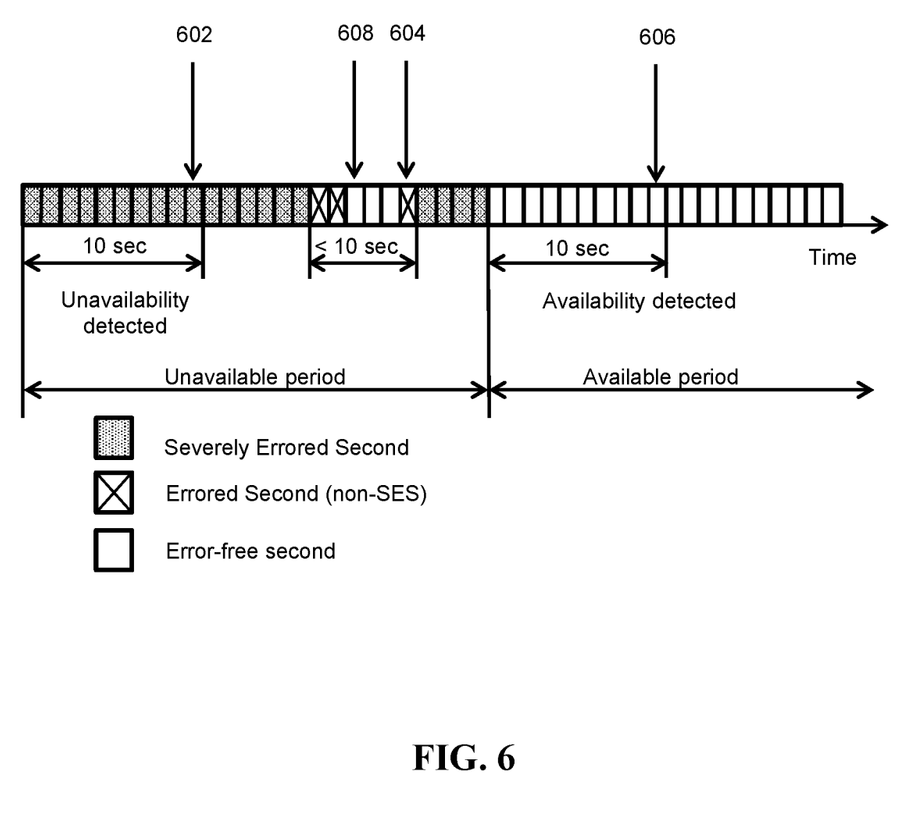
FIG. 6 shows an EPM state period timeline evaluated by the defect detection module.

FIG. 6 shows an EPM state period timeline evaluated by the defect detection module. In an example scenario shown in FIG. 6, if the immediately past one-second time period is indicated by 602, and if the defect detection module determines that the immediately past one-second time period is a SES (in operation 504 of FIG. 5), then the defect detection module can determine that the number of past consecutive events (e.g., past 10 seconds including the immediately past one-second time period) are SES. If the defect detection module determines that the number of past consecutive events are all determined as SES by the defect detection module (as shown in FIG. 6), then the defect detection module can determine that an unavailability condition exists for the PSN for the past number of consecutive events (as shown as "unavailability detected" in FIG. 6). In some embodiments, at operation 506 of FIG. 5, the defect detection module can send a message to a sender device (or another device associated with an administrator) that indicates that an unavailability condition is detected for the past number of consecutive events.

In FIG. 5, at operation 504, if the defect detection module determines that the immediately past one-second time period is not an SES, then the defect detection module can determine that the immediately past one-second time period is an ES and perform operation 508. As explained in this patent document, an ES can be described as a one-second period with either one or more expected periodic test packet not received (e.g., if the difference between a number of plurality of BFD control packets received and an expected number of packets is greater than or equal to one) or if one or more defects are detected. At operation 508, the defect detection module can evaluate whether an unavailability condition exists for the PSN by evaluating a past number of consecutive events for error performance. For example, a number of past consecutive events can include the past ten seconds that includes the immediately past one-second time period and the previous nine seconds immediately preceding the immediately past one-second time period.

In an example scenario shown in FIG. 6, if the immediately past one-second time period is indicated by 604, and if the defect detection module determines that the immediately past one-second time period is an ES (in operation 504 of FIG. 5), then the defect detection module can determine that the number of past consecutive events (e.g., past 10 seconds including the immediately past one-second time period) include three ES, three error-free second, and four SES. In some embodiments, at operation 508 of FIG. 5, the defect detection module can send a message to a sender device (or another device associated with an administrator) that indicates metrics associated the number of past consecutive events. Using the above example, the metrics can indicate that the past ten seconds included three ES, three error-free second, and four SES. At operation 508, the defect detection module can determine that an availability period exists if the number of past consecutive events includes only ES and/or error-free second. Thus, at operation 508, the defect detection module can determine that an availability period exists if the immediately past one-second time period is ES and the previous nine seconds immediately preceding the immediately past one-second time period are not SES (e.g., zero or more ES and/or zero or more error-free seconds). For example, if the defect detection module determines at operation 508 that the immediately past one-second time period is an ES and the previous nine seconds immediately preceding the immediately past one-second time period are all error-free seconds, then the defect detection module can determine that an availability period exists. In another example, an availability period exists if the immediately past one-second time period and the previous nine seconds immediately preceding the immediately past one-second time period are all ES.

In FIG. 5, if the defect detection module determines that the expected packet count is not greater than the received packet counter value at operation 502, then the defect detection module determines that the immediately past one-second time period is an "error-free second." If the defect detection module determines that the immediately past one-second time period is an "error-free second," then the defect detection module proceeds to operation 510, where the defect detection module determines whether an availability period exists as further described below using FIG. 6.

In an example scenario shown in FIG. 6, if the immediately past one-second time period is an "error-free second" as indicated by 606, and if the defect detection module determines that the immediately past nine events are also "error-free seconds," then the defect detection module determines that an availability condition exists. In some embodiments, at operation 510 of FIG. 5, the defect detection module can send a message to a sender device (or another device associated with an administrator) that indicates that an availability condition is detected for the past number of consecutive events. In another example scenario shown in FIG. 6, if the immediately past one-second time period is an "error-free second" as indicated by 608, and if the defect detection module determines that the immediately past nine events include at least one SES, then the defect detection module determines that an unavailability condition persists. In some embodiments, at operation 510 of FIG. 5, the defect detection module can send a message to a sender device (or another device associated with an administrator) that indicates that an unavailability condition persists over the past number of consecutive events. At operation 510, the defect detection module can determine that an availability period exists if the number of past consecutive events includes only ES and/or error-free second. For example, if the defect detection module determines at operation 510 that the immediately past one-second time period is an error-free second and the previous nine seconds immediately preceding the immediately past one-second time period are all ES, then the defect detection module can determine that an availability period exists.

The defect detection module of the receiver device can report its determined state (e.g., an unavailability condition exists or an availability condition exists and/or the metrics of the past number of consecutive events) to a sender device that sends the BFD control packets or to a software defined networking (SDN) controller. The determined state can be reported periodically or in response to a query requesting status information from the sender device or SDN controller. In some embodiments, an extended BFD can be used by a device (e.g., sender device or SDN controller) in a BFD system to query the BFD receiver device that supports EPM.

Figure 7:
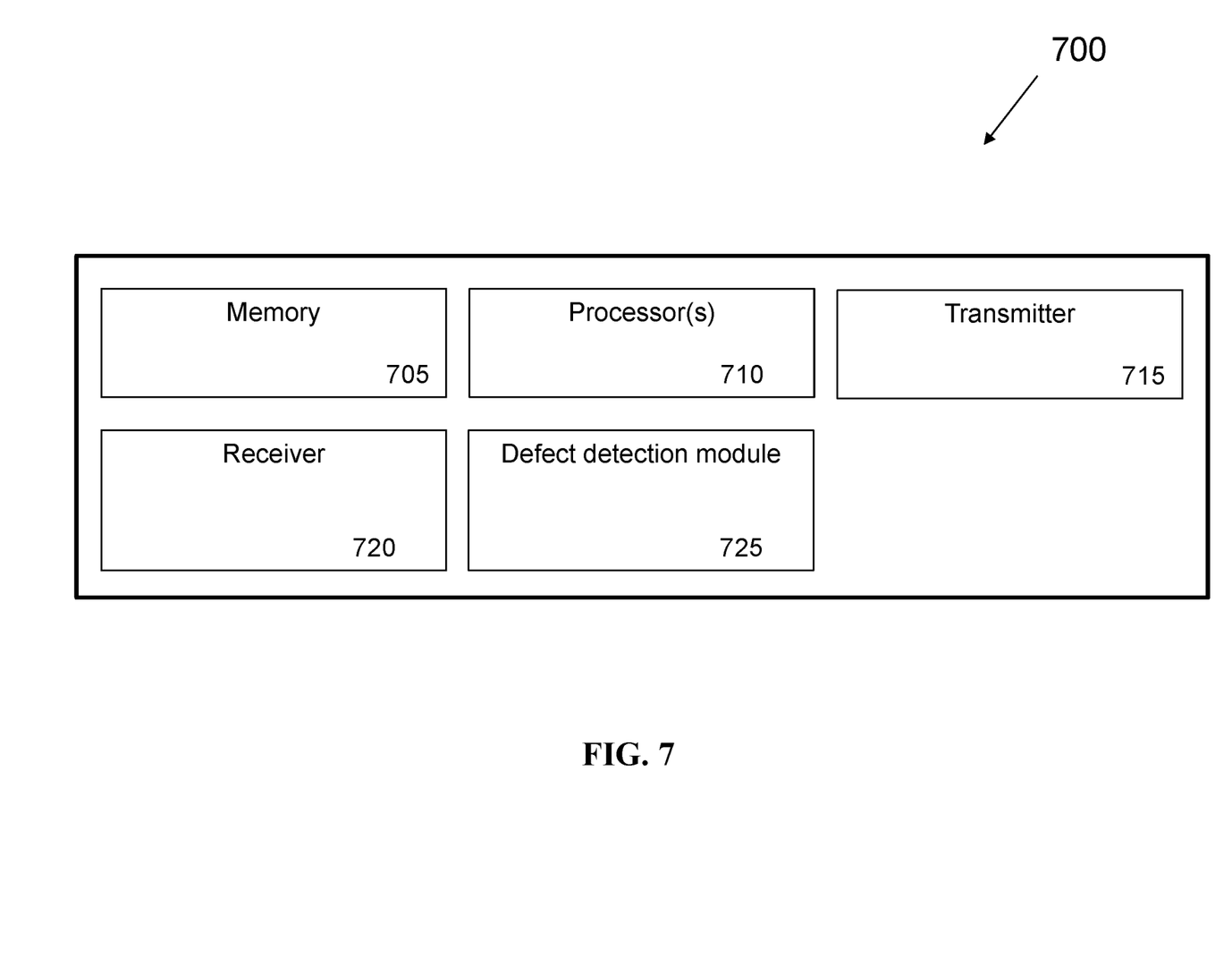
FIG. 7 shows an exemplary block diagram of a hardware platform that may be a part of a network device.

FIG. 7 shows an exemplary block diagram of a hardware platform 700 that may be a part of a network device (e.g., receiver device as described in this patent document). The hardware platform 700 includes at least one processor 710 and a memory 705 having instructions stored thereupon. The instructions upon execution by the processor 710 configure the hardware platform 700 to perform the operations described in FIGS. 1 to 6 and 8, and in the various embodiments described in this patent document. The transmitter 715 transmits or sends information or data to another device. For example, a receiver device's transmitter can send informative indicative of availability period or unavailability period to another device. The receiver 720 receives information or data transmitted or sent by another node. For example, a receiver device's receiver can receive an BFD control packet from a sender device. The defect detection module 725 can perform the operations described in this patent document.

Figure 8:
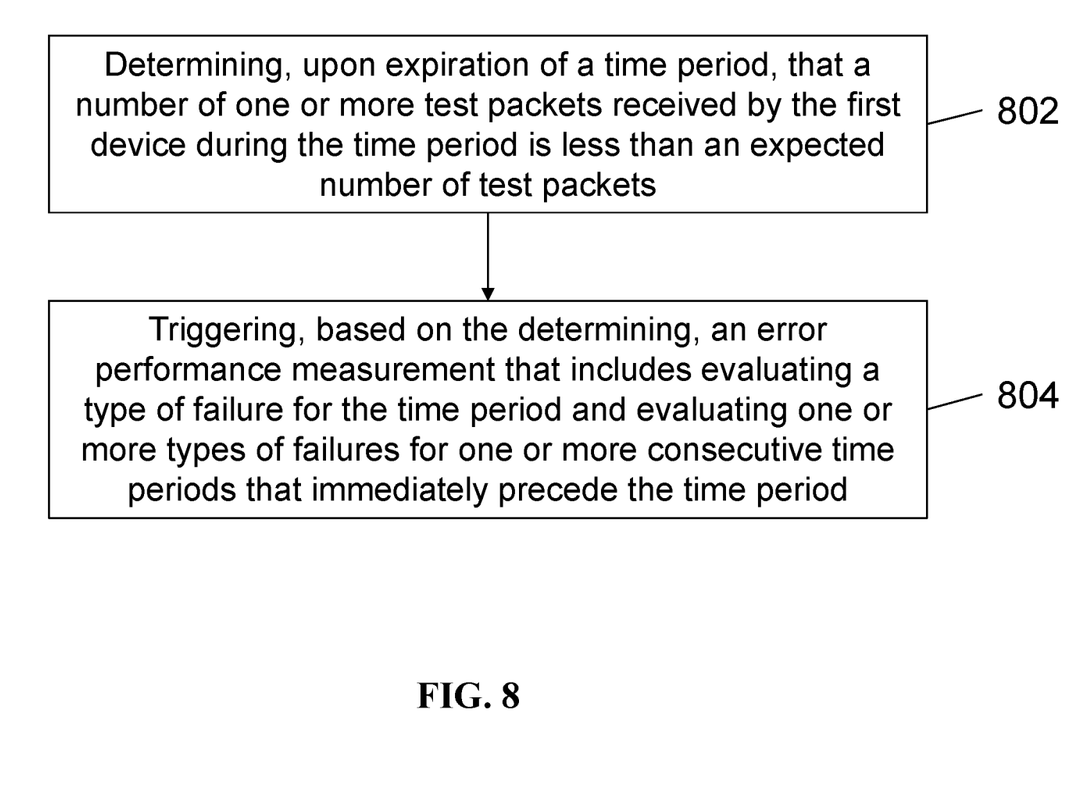
FIG. 8 shows an example flowchart to perform an error performance measurement.

FIG. 8 shows an example flowchart to perform an error performance measurement. Operation 802 includes determining, upon expiration of a time period (e.g., a one-second time period), that a number of one or more test packets received by the first device during the time period is less than an expected number of test packets, wherein the one or more test packets are received by the first device from the second device in a packet data communication network. Operation 804 includes triggering, based on the determining, an error performance measurement that includes evaluating a type of failure for the time period and evaluating one or more types of failures for one or more consecutive time periods that immediately precede the time period.

In some embodiments, each of the one or more test packets includes a field that indicates whether a defect condition exists, and the evaluating the type of failure for the time period includes: determining that the type of failure for the time period is an errored second (ES) either (1) upon determining that a difference between the number of the one or more test packets and the expected number of test packets is greater than or equal to one, or (2) upon determining that the one or more test packets indicate that the defect condition exists, or (3) upon determining that no test packets were received within a second time period (e.g., detection interval). In some embodiments, the second time period can have at least some portion that overlaps with the time period. In some embodiments, the evaluating the type of failure for the time period and the evaluating the one or more types of failures for one or more consecutive time periods that immediately precede the time period includes: determining that a state of connection between the first device and the second device is available upon determining that the type of failure for the time period is ES and upon determining that the one or more types of failures for the one or more consecutive time periods are one or more ES, or one or more error-free second condition, or any combination thereof, wherein the one or more error-free second condition includes one or more time periods in which the type of failure is not the ES or a severely errored second (SES); and transmitting, to the second device or another device, a message that indicates that the state of connection is available.

In some embodiments, each of the one or more test packets includes: a field that indicates whether a defect condition exists, and the evaluating the type of failure for the time period includes: determining that the type of failure for the time period is a severely errored second (SES) either (1) upon determining that a difference between the expected number of test packets and the number of the one or more test packets received is more than a configurable percentage of the expected number of test packets, or (2) upon determining that the one or more test packets indicate that the defect condition exists, or (3) upon determining that no test packets were received within a second time period. In some embodiments, the evaluating the type of failure for the time period and the evaluating the one or more types of failures for one or more consecutive time periods that immediately precede the time period includes: determining that a state of connection between the first device and the second device is unavailable upon determining that the type of failure for the time period and the one or more types of failures for the one or more consecutive time periods are the SES; and transmitting, to the second device or another device, a message that indicates that the state of connection is unavailable. In some embodiments, the packet data communication network is a packet switching network (PSN).

In this patent document the term "exemplary" is used to mean "an example of" and, unless otherwise stated, does not imply an ideal or a preferred embodiment. In this patent document, the term "second" or "errored second" or "severely errored second" are used for ease of explanation and do not imply that error performance can only be determined for a one-second time period. The techniques described in this patent document can be employed for a timer or time period longer than or shorter than one-second.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of packet communication, comprising:
receiving, by a first device from a second device, one or more test packets, wherein each of the one or more test packets includes a field that indicates whether a defect condition exists;
determining, upon expiration of a time period, that a number of the one or more test packets received by the first device during the time period is less than an expected number of test packets and that a defect counter is not greater than zero, wherein the defect counter indicates a second number of the one or more test packets that indicates a number of times the defect condition exists; and
triggering, based on the determining, an error performance measurement that includes evaluating a type of failure for the time period and evaluating one or more types of failures for one or more consecutive time periods that immediately precede the time period.

2. The method of claim 1,
wherein the evaluating the type of failure for the time period includes:
determining that the type of failure for the time period is an errored second (ES) either (1) upon determining that a difference between the number of the one or more test packets and the expected number of test packets is greater than or equal to one, or (2) upon determining that the one or more test packets indicate that the defect condition exists, or (3) upon determining that no test packets were received within a second time period.

3. The method of claim 2, wherein the evaluating the type of failure for the time period and the evaluating the one or more types of failures for one or more consecutive time periods that immediately precede the time period includes:
determining that a state of connection between the first device and the second device is available upon determining that the type of failure for the time period is ES and upon determining that the one or more types of failures for the one or more consecutive time periods are one or more ES, or one or more error-free second condition, or any combination thereof,
wherein the one or more error-free second condition includes one or more time periods in which the type of failure is not the ES or a severely errored second (SES); and
transmitting, to the second device or another device, a message that indicates that the state of connection is available.

4. The method of claim 1,
wherein the evaluating the type of failure for the time period includes:
determining that the type of failure for the time period is a severely errored second (SES) either (1) upon determining that a difference between the expected number of test packets and the number of the one or more test packets received is more than a configurable percentage of the expected number of test packets, or (2) upon determining that the one or more test packets indicate that the defect condition exists, or (3) upon determining that no test packets were received within a second time period.

5. The method of claim 4, wherein the evaluating the type of failure for the time period and the evaluating the one or more types of failures for one or more consecutive time periods that immediately precede the time period includes:
determining that a state of connection between the first device and the second device is unavailable upon determining that the type of failure for the time period and the one or more types of failures for the one or more consecutive time periods are the SES; and
transmitting, to the second device or another device, a message that indicates that the state of connection is unavailable.

6. The method of claim 1, wherein the packet data communication network is a packet switching network (PSN).

7. An apparatus for packet communication comprising a processor, configured to implement a method comprising:
receive, by a first device from a second device, one or more test packets, wherein each of the one or more test packets includes a field that indicates whether a defect condition exists;
determine, upon expiration of a time period, that a number of the one or more test packets received by the first device during the time period is less than an expected number of test packets and that a defect counter is not greater than zero, wherein the defect counter indicates a second number of the one or more test packets that indicates a number of times the defect condition exists; and
trigger, based on the determine, an error performance measurement that includes an evaluation of a type of failure for the time period and of one or more types of failures for one or more consecutive time periods that immediately precede the time period.

8. The apparatus of claim 7,
wherein the evaluation of the type of failure for the time period includes:
determine that the type of failure for the time period is an errored second (ES) either (1) upon a determination that a difference between the number of the one or more test packets and the expected number of test packets is greater than or equal to one, or (2) upon a determination that the one or more test packets indicate that the defect condition exists, or (3) upon a determination that no test packets were received within a second time period.

9. The apparatus of claim 8, wherein the evaluation of the type of failure for the time period and of the one or more types of failures for one or more consecutive time periods that immediately precede the time period includes:
determine that a state of connection between the first device and the second device is available upon a determination that the type of failure for the time period is ES and upon a determination that the one or more types of failures for the one or more consecutive time periods are one or more ES, or one or more error-free second condition, or any combination thereof,
wherein the one or more error-free second condition includes one or more time periods in which the type of failure is not the ES or a severely errored second (SES); and
transmit to the second device or another device, a message that indicates that the state of connection is available.

10. The apparatus of claim 7,
wherein the evaluation of the type of failure for the time period includes:
determine that the type of failure for the time period is a severely errored second (SES) either (1) upon a determination that a difference between the expected number of test packets and the number of the one or more test packets received is more than a configurable percentage of the expected number of test packets, or (2) upon a determination that the one or more test packets indicate that the defect condition exists, or (3) upon a determination that no test packets were received within a second time period.

11. The apparatus of claim 10, wherein the evaluation of the type of failure for the time period and of the one or more types of failures for one or more consecutive time periods that immediately precede the time period includes:
determine that a state of connection between the first device and the second device is unavailable upon a determination that the type of failure for the time period and the one or more types of failures for the one or more consecutive time periods are the SES; and
transmit, to the second device or another device, a message that indicates that the state of connection is unavailable.

12. The apparatus of claim 7, wherein the packet data communication network is a packet switching network (PSN).

13. A non-transitory computer readable program storage medium having code stored thereon, the code, when executed by a processor, causing the processor to implement a method comprising:
receiving, by a first device from a second device, one or more test packets, wherein each of the one or more test packets includes a field that indicates whether a defect condition exists;
determining, upon expiration of a time period, that a number of the one or more test packets received by the first device during the time period is less than an expected number of test packets and that a defect counter is not greater than zero, wherein the defect counter indicates a second number of the one or more test packets that indicates a number of times the defect condition exists; and
triggering, based on the determining, an error performance measurement that includes evaluating a type of failure for the time period and evaluating one or more types of failures for one or more consecutive time periods that immediately precede the time period.

14. The non-transitory computer readable program storage medium of claim 13,
wherein the evaluating the type of failure for the time period includes:
determining that the type of failure for the time period is an errored second (ES) either (1) upon determining that a difference between the number of the one or more test packets and the expected number of test packets is greater than or equal to one, or (2) upon determining that the one or more test packets indicate that the defect condition exists, or (3) upon determining that no test packets were received within a second time period.

15. The non-transitory computer readable program storage medium of claim 14, wherein the evaluating the type of failure for the time period and the evaluating the one or more types of failures for one or more consecutive time periods that immediately precede the time period includes:
determining that a state of connection between the first device and the second device is available upon determining that the type of failure for the time period is ES and upon determining that the one or more types of failures for the one or more consecutive time periods are one or more ES, or one or more error-free second condition, or any combination thereof,
wherein the one or more error-free second condition includes one or more time periods in which the type of failure is not the ES or a severely errored second (SES); and
transmitting, to the second device or another device, a message that indicates that the state of connection is available.

16. The non-transitory computer readable program storage medium of claim 13,
wherein the evaluating the type of failure for the time period includes:
determining that the type of failure for the time period is a severely errored second (SES) either (1) upon determining that a difference between the expected number of test packets and the number of the one or more test packets received is more than a configurable percentage of the expected number of test packets, or (2) upon determining that the one or more test packets indicate that the defect condition exists, or (3) upon determining that no test packets were received within a second time period.

17. The non-transitory computer readable program storage medium of claim 16, wherein the evaluating the type of failure for the time period and the evaluating the one or more types of failures for one or more consecutive time periods that immediately precede the time period includes:
determining that a state of connection between the first device and the second device is unavailable upon determining that the type of failure for the time period and the one or more types of failures for the one or more consecutive time periods are the SES; and
transmitting, to the second device or another device, a message that indicates that the state of connection is unavailable.

18. The non-transitory computer readable program storage medium of claim 13, wherein the packet data communication network is a packet switching network (PSN).

* * * * *

UNITED STATES PATENT AND TRADEMARK OFFICE
CERTIFICATE OF CORRECTION

PATENT NO. : 11,303,551 B2  
APPLICATION NO. : 16/926540  
DATED : April 12, 2022  
INVENTOR(S) : Gregory Mirsky Page 1 of 1

It is certified that error appears in the above-identified patent and that said Letters Patent is hereby corrected as shown below:

In the Specification

In Column 2, Line 37, delete "DRAWING" and insert -- DRAWINGS --, therefor.

In Column 3, Line 57, delete "indicate a" and insert -- indicate --, therefor.

In Column 5, Line 55, delete "where" and insert -- were --, therefor.

In Column 7, Line 14, delete "the any" and insert -- any --, therefor.

In Column 8, Line 42, delete "percentage))," and insert -- percentage), --, therefor.

In Column 9, Line 38, delete "the" and insert -- with the --, therefor.

Signed and Sealed this  
Twenty-seventh Day of June, 2023

Katherine Kelly Vidal  
*Director of the United States Patent and Trademark Office*